3,071,421
COMPENSATED PRE-LOADED BEARING

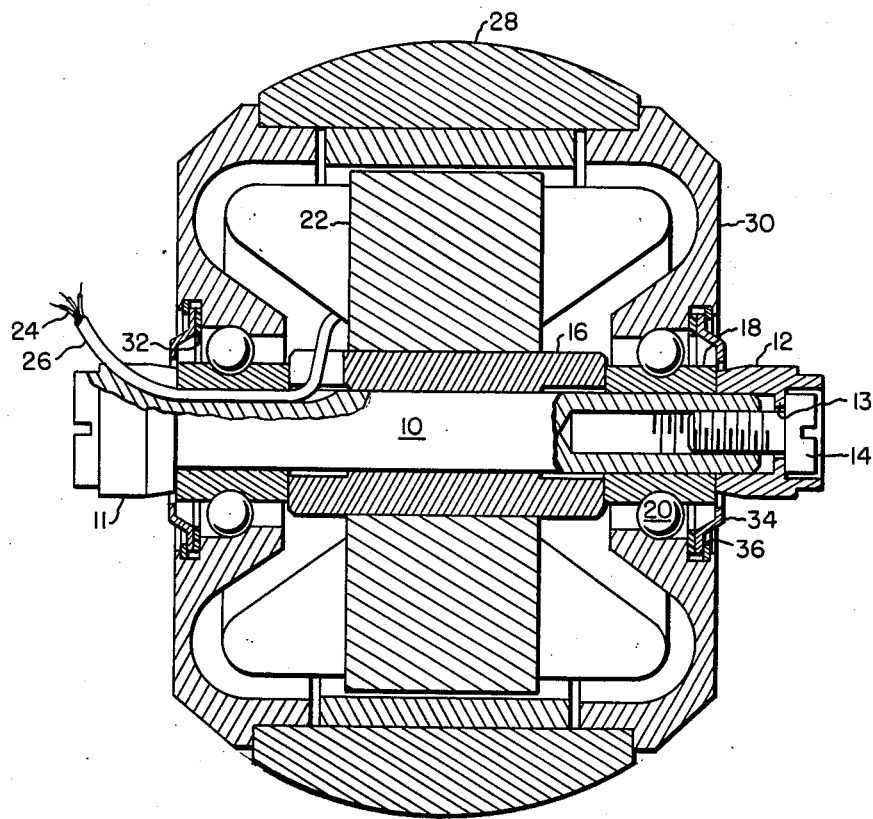
INVENTORS
WILLIAM A. JONES
ERNEST W. JOHNSON
BY KENWAY, JENNEY, WITTER & HILDRETH
ATTORNEYS

William A. Jones, Hingham, and Ernest W. Johnson, Randolph, Mass., assignors, by mesne assignments, to Northrop Corporation, Beverly Hills, Calif., a corporation of California
Filed Sept. 15, 1958, Ser. No. 761,232
3 Claims. (Cl. 308—178)

This invention relates to a pre-loaded bearing assembly for use with gyroscopes, motors and similar devices, and is particularly directed towards to bearing assembly in which the relative positions of the parts and the load on the bearing members remain substantially constant over a wide range of temperatures.

In precision mechanisms which rotate at high rates of speed there is a great need for components capable of dependable performance under changing conditions. Gyroscopic instruments in particular require constant speed and steady load operation to produce accuracy.

A particularly problem that has plagued devices of this sort is sensitivity to changes in ambient temperature and resulting erratic behavior of the instrument, particularly if it is one made to close tolerances. It has, of course, long been known that changes in temperature cause expansion and contraction of materials and, in devices such as bearing structures, produce a change in relative positions of their parts, in turn causing changes in load particularly on bearing members. The effect of this is to alter the speed of rotation and in some instances to cause actual failure of the bearing. In any event, accuracy and dependability are adversely effected and the life expectancy of the device is substantially reduced. In precision-miniature and sub-miniature components this problem looms even larger, and heretofore there has been no effective remedy.

Although these difficulties will not be encountered where the bearing is composed of parts haivng the same coefficient of expansion, it is highly desirable to utilize a rotor of unusually dense and heavy metal in order to achieve a high angular momentum. However, it is not feasible to solve the problem by having all the various components of a bearing assembly constructed of heavy metal since certain parts must be made of materials having properties not found in heavy metal.

For instance, the end cups should possess resilient qualities, requiring them to be made of spring steel, which is not a heavy metal. The demands on the bearing balls dictate that they be hard and possess a limited amount of elasticity, high-carbon chrome-alloy steel being admirably suited for these purposes.

Other parts of the bearing similarly must be made of materials possessing properties best suited for each particular purpose, and, of necessity, there will be present parts having different expansion characteristics. Thus arose the difficulties of the effect of temperature changes on the bearing assembly.

The present invention concerns itself with a solution to these problems by providing a pre-loaded bearing assembly that is not seriously affected by temperature variations and is capable of substantially constant-load operation throughout a wide range of changing temperatures. These difficulties have been resolved by a novel approach to the problem involving an application of known principles in a new cooperative arrangement.

By combining in a bearing assembly annular cup-shaped disk springs, in the form of modified Belleville washers, with a rotor and a spacer having different coefficients of thermal expansion, the desired result may be effectively and satisfactorily attained. More specifically, in a typical bearing assembly where a rotor is mounted about spaced rows of ball bearings fitted to a shaft, an end cup in the form of a modified Belleville washer is compressed into position between each row of ball bearings and the rotor, a central portion of the washer forming an outer bearing race for the balls, with a spacer mounted on the shaft to maintain axial displacement between the rows of ball bearings. The end cup is formed with an axially extending peripheral flange engaging the rotor, such that the body of the end cup is axially spaced outwardly of the rotor. The spacer is of a material having a coefficient of expansion greater than that of the rotor, making possible the following result:

As the ambient temperature rises the rotor will expand both radially and axially, and the end cup, being initially compressed between the rotor and the bearings, will also expand with the result that it will increase its outward convexity, because of a tendency of radial segments of the washer to flatten; the balls will tend to be subjected to increased axial and radial compression by the outer race, because of the tendency of the outer race to become axially misaligned from the inner race. This increased compression will increase the load on the balls and, of course, effect the operating characteristics of the bearings.

A load on any ball bearing assembly will, to a greater or lesser extent, flatten the balls at points of contact with the races since the balls possess elastic qualities to a certain degree. However, if the load becomes too great, the ball will flatten beyond its elastic limit and the bearing will fail. In the present situation, if the increased compression of the end cup creates a load in excess of the elasticity of the ball the bearing will fail.

To correct for this increased load we provide a spacer between the races having a rather high coefficient of expansion to supply an axial thrust on the inner bearing races and thereby compensate for the added load and thus maintain the pre-load constant. In effect the spacer causes the races to retreat axially as the outward convexity of the end cup increases. Should the inner races maintain their initial position, obviously, the load on the balls would increase with an increase of outward convexity of the end cup axially and radially upon the balls. As previously indicated the compression of the washer increases with a rise in temperature. The spacer forces the inner races apart axially, and thereby approximately maintains their axial alignment with the outer races of the end cups, which expand outwardly in axial directions. The radial and axial compression of the end cups upon the balls is thereby relieved to a degree which may be controlled by the relative coefficients of expansion of the parts and the loading of the bearings may be maintained at a substantially constant level over a wide range of temperatures by proper selection of these constants.

The radial grip between the Belleville washer and the rotor also remains unaltered throughout changes in temperature and may be classified as another advantage gained by this invention.

Therefore, it is an object of this invention to provide a bearing assembly that operates on a substantially constant load under varying temperature conditions.

Another object of this invention is to provide a pre-loaded bearing having a heavy metal rotor in which the load is maintained substantially constant despite changes in temperature, and the life expectancy is substantially increased.

Another object of this invention is to provide means for correcting for deflection of a modified Belleville washer used in a bearing unit.

These and other objects and features will more readily appear from a detailed discussion of a preferred embodiment of my invention with reference being made to the accompanying drawing which is a view in elevation, partly in section, showing the important parts of the invention as incorporated in a gyro motor.

In the drawing which shows a gyroscopic motor embodying the present invention, a shaft 10 is provided with an integral hub 11 on one end and an adjustable collar 12 on the opposite end. The collar end of the shaft 10 is internally threaded to receive an adjusting screw 14, the head of which bears against the annular shoulders 13 of the collar 12 so that rotation of the screw 14 is effective to control the axial position of all parts along the shaft 10.

A cylindrical spacer member 16 is keyed to the shaft 10 separating two inner races 18 for bearing balls 20. The spacer 16 is preferably of steel having a coefficient of thermal expansion of approximately $6 \times 10^{-6}/°F$. In this embodiment a stator 22 is fixedly mounted about spacer 16 and is connected to a power source by electrical leads 24 encased in a nylon sleeve 26 passing through a conduit formed in the spacer 16 and the shaft 10.

Spaced from and surrounding the stator 22 is a rotor and hysteresis ring assembly 28 formed of a heavy metal, such as sintered tungsten and a binder, having a coefficient of thermal expansion of approximately $3.75 \times 10^{-6}/°F$. The rotor 28 is supported by a pair of end cups in the form of modified Belleville washers 30 on either end of the shaft, each end cup 30 compressed between each row of bearing balls 20 and the rotor 28 so as to grip the rim of the rotor 28. The end cups 30 are each formed with an axially extending peripheral flange, such as to be convex in an axially outward direction from the rotor, the bodies of the end cups being axially spaced outwardly of the rotor. A radial segment of one of the end cups forms a substantially L-shaped section as shown, whose legs extend radially inwardly toward the shaft and axially toward the rotor, respectively.

Centrally positioned in a circular groove of the end cup 30 is an annulus 32 and a seal 34 held in place by a retaining ring 36, effective to prevent foreign matter from entering the bearing assembly.

To insure a complete understanding of the invention and to appreciate the inventive qualities of the device, some discussion is desirable as to the function and operation of the end cup or modified Belleville washer 30. Essentially, a Belleville washer is a type of spring, commonly used where space is limited in the direction of load application, and basically takes the shape of a circular disk of constant thickness having an initial dish giving it a cone-like appearance. The load deflection characteristics of the spring are controlled by the ratio between the depth of the dish and the thickness of the spring. A washer having a large ratio of depth to thickness offers a considerable range of deflection within which the load is practically constant, such as would be desirable in these circumstances.

In the event of an increase in temperature, the end cups 30 expand radially outwardly with the rotor 28. The bodies of the end cups, being of smaller diameter than the axially extending peripheral flanges, grow outwardly to a lesser extent. A greater radial restraint is therefore exerted upon the flanges at their junctions with the bodies of the end cups than at their axially inner free ends. As a result, the flanges tend to assume a frusto-conical form by expanding radially more rapidly at their axially inner free ends. The end cups therefore tend to flatten. The radial restraint imposed on the free ends of the flanges by the rotor forces some of the flattening to appear as axially outward movement of the bodies of the end cups near their centers; that is, the bodies of the end cups spring outwardly or "oil can," and assume a frusto-conical form. As a result, each end cup as a whole increases its outward convexity, and tends to exert increased axial and radial compression upon the balls 20, which are restrained axially by the shaft.

However, the spacer 16, having a greater coefficient of thermal expansion than the rotor 28, will expand axially with the shaft 10 to a greater extent, and will force the inner bearing races 18 axially outwardly with respect to the rotor. The provision of a greater coefficient of expansion in the spacer than in the rotor thus serves to force the races 18 axially outwardly to substantially maintain the original alignment of the balls 20 with the outer races of the washers 30, relieving the increased compression of the balls which the thermal expansion of the end cups tends to produce.

Thus it will be appreciated that the material used in the spacer 16 should be selected with a view towards the difference in sizes between the spacer and the rotor, the coefficient of expansion of the material in the rotor, the washer and the shaft, and the characteristics of the end cups, as well as considering the expected deflection and compression of the end cup and the desired axial movement of the races.

Obviously then, a great many variations may be made without departing from the spirit of the invention. For instance, with the motor omitted it may be used as a simple bearing assembly with any number of various applications. Also changes in specific materials may be made according to the requirements of a particular situation. Therefore it is not intended that the invention be limited to the specifically described and illustrated embodiments, but by the appended claims and their equivalents.

What we claim as new and desire to secure by Letters Patent of the United States is:

1. A pre-loaded bearing assembly comprising a shaft, two rows of bearing balls, two inner races initially aligned with said rows of bearing balls and mounting them in axially-spaced relation on said shaft, a rotor having a relatively low coefficient of thermal expansion spaced circumferentially about said shaft, a pair of resilient end cups each compressed between one of said rows of bearing balls and said rotor to rotatably support said rotor on said shaft, each of said end cups extending axially outwardly and radially inwardly from its engagement with said rotor to its engagement with the bearing balls, said rotor and said end cups tending to displace said bearing balls axially outwardly in response to an increase in temperature to increase the compression of said bearing balls, and a spacer having a relatively high coefficient of thermal expansion extending axially between said inner races for expansion in response to said increase in temperature to axially displace said inner races for maintaining their alignment with said bearing balls.

2. A pre-loaded bearing assembly comprising a shaft, two rows of bearing balls, two inner races initially aligned with said rows of bearing balls and mounting them in axially-spaced relation on said shaft, a rotor having a relatively low coefficient of thermal expansion spaced circumferentially about said shaft, a pair of resilient end cups each compressed between one of said rows of bearing balls and said rotor to rotatably support said rotor on said shaft, said rotor terminating at either end thereof axially inwardly of said rows of bearing balls, said rotor and said end cups tending to displace said bearing balls axially outwardly in response to an increase in temperature to increase the compression of said bearing balls, and a spacer having a relatively high coefficient of thermal expansion extending axially between said inner races for expansion in response to said increase in temperature to axially displace said inner races for maintaining their alignment with said bearing balls.

3. A pre-loaded bearing assembly comprising a shaft, two rows of bearing balls, two inner races initially aligned with said rows of bearing balls and mounting them in axially-spaced relation on said shaft, a rotor having a relatively low coefficient of thermal expansion spaced circumferentially about said shaft, a pair of resilient end cups each compressed between one of said rows of bearing balls and said rotor to rotatably support said rotor on said shaft, each of said end cups formed with a peripheral portion extending axially therefrom to engage said rotor, said end cups engaging said bearing balls at points spaced axially outwardly of said rotor, said rotor and said end cups tending to displace said bearing balls axially outwardly in response to an increase in temperature to increase the compression of said bearing balls, and a spacer having a relatively high coefficient of thermal expansion extending axially between said inner races for expansion in response to said increase in temperature to axially displace said inner races for maintaining their original alignment with said bearing balls.

References Cited in the file of this patent

UNITED STATES PATENTS

| | | |
|---|---|---|
| 2,410,002 | Bach | Oct. 29, 1946 |
| 2,550,908 | Bryant et al. | May 1, 1951 |
| 2,711,356 | Ensinger | June 21, 1955 |
| 2,727,796 | Sardou | Dec. 20, 1955 |
| 2,731,836 | Wendt | Jan. 24, 1956 |
| 2,771,778 | Ryberg | Nov. 27, 1956 |
| 2,782,078 | Wright | Feb. 19, 1957 |
| 2,839,934 | Shomphe | June 24, 1958 |